United States Patent [19]
Easter

[11] Patent Number: 5,887,895
[45] Date of Patent: Mar. 30, 1999

[54] WHEEL LUBRICATING DEVICE

[76] Inventor: Basil O. Easter, P.O. Box 582, Matherville, Ill. 61263

[21] Appl. No.: 845,007

[22] Filed: Apr. 22, 1997

[51] Int. Cl.$^6$ ....................................................... B60R 9/18
[52] U.S. Cl. ............................ 280/762; 280/757; 184/3.2
[58] Field of Search ................................... 280/762, 757, 280/727; 291/3; 184/3.2

[56] References Cited

U.S. PATENT DOCUMENTS

| | | | |
|---|---|---|---|
| 1,770,389 | 7/1930 | Bullock | 184/3.2 |
| 2,455,847 | 12/1948 | Winther | 184/3.2 |
| 2,550,865 | 5/1951 | Ross et al. | 184/3.2 |
| 2,625,417 | 1/1953 | Sundheim | 280/757 |
| 4,324,307 | 4/1982 | Schittino et al. | 180/313 |
| 5,273,315 | 12/1993 | Debus | 280/762 |
| 5,477,941 | 12/1995 | Kamar et al. | 184/3.2 |

*Primary Examiner*—Christopher P. Ellis
*Attorney, Agent, or Firm*—Rockey, Milnamow & Katz

[57] ABSTRACT

A mechanism adapted for reducing damage to a tire of a vehicle caused by execution of sharp turns, the tire being adapted to roll across the ground surface during forward vehicle travel, and said tire slides across the surface of the ground laterally with respect to forward vehicle travel during execution of sharp turns such that the tire encounters large laterally directed forces during execution of said sharp turn. A sprayer is carried by said vehicle for lubricating said tire with a lubricating fluid such that the fluid lubricates the tire for reducing friction between the tire and the ground as the tire slides laterally across the ground surface during execution of a sharp turn. An operator engagable control is provided for allowing the operator to selectively actuate the sprayer.

8 Claims, 1 Drawing Sheet

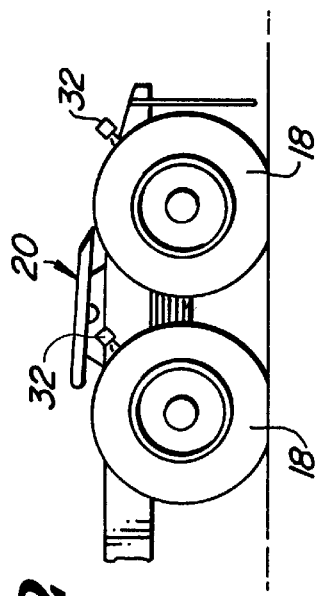
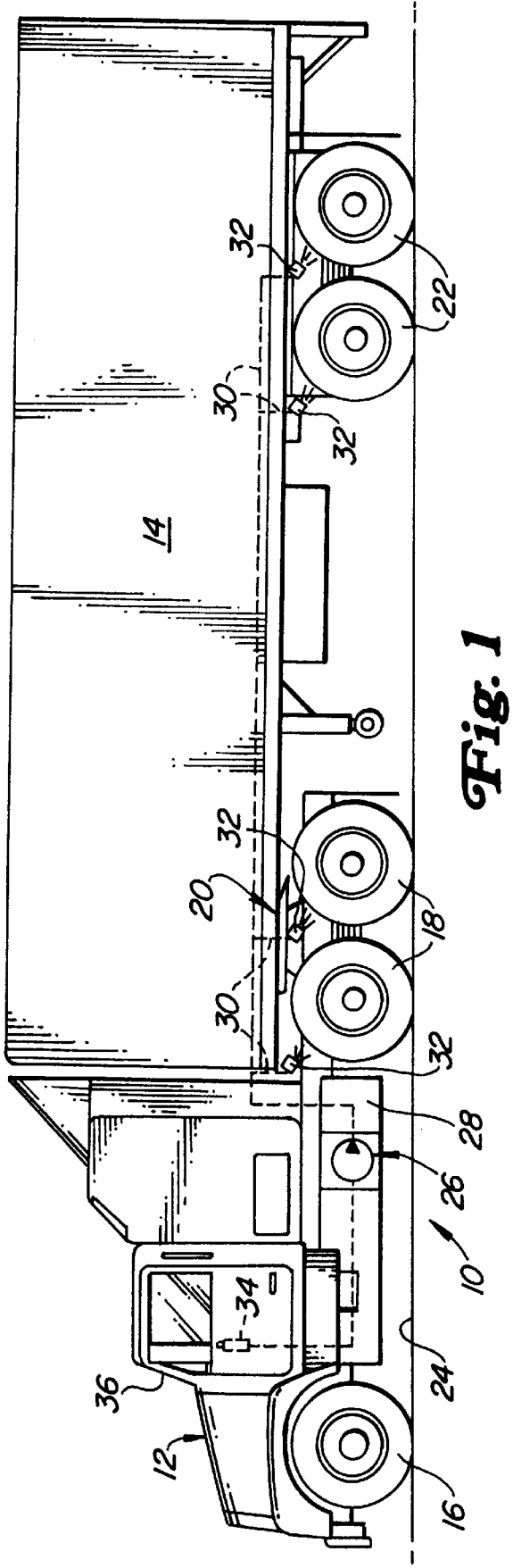

WHEEL LUBRICATING DEVICE

BACKGROUND OF THE INVENTION

1) Field of the Invention

Large highway vehicles such as semi-tractor trailers include rubber tired wheels which roll in contact with the road surface during forward travel. When these vehicles maneuver in confined spaces such as parking lots and loading dock areas they are often required to execute relatively tight turns. Typically the front wheels of these vehicles are steerable and therefore can turn to execute a vehicle turn. The other wheels of the semi or trailer typically are not adapted to turn in this manner, and therefore these other rear wheels can be dragged laterally across the pavement during execution of extremely tight turns. Friction between the wheel and the pavement causes the wheel to encounter large laterally directed forces during execution of a tight turn. These laterally directed friction forces cause the tires to wear, and can even cause the tread of the tire to be loosened or torn from the tires. Re-tread tires are especially susceptible to being torn apart by the lateral loads encountered by the tires during these small radius turns. The lateral friction forces and problems associated therewith are particularly acute in warm weather when friction between the warm tires and warm pavement is especially high. Pavement surfaces such as asphalt can also be damaged by the lateral dragging of semi tires during tight turns, especially in summer when the asphalt is warm and relatively soft.

2) Related Art

Several prior art devices have addressed problems associated with tires contacting the road surface. It is known in the prior art to spray tires with de-icing fluids which will help melt ice that has formed on the tires or roadway. These devices, such as that shown in U.S. Pat. No. 4,324,307, are designed to increase the friction between the tires and the roadway. Increased friction between the tires and road would only increase the damage to the tires and pavement surface when executing tight turns as described above.

In the railroad art it is known to lubricate the vertically extending flanges of train wheels as the train rounds a corner. The flanges tend to rub against the side edges of the rails as the train rounds a bend in the track, and the lubrication of the flange during turns decreases friction and generally prevents the flanges from wearing excessively. Patents such as U.S. Pat. No. 2,455,847 and U.S. Pat. No. 1,770,389 show such mechanisms. However, these references do not address the problem of lateral friction forces encountered by horizontal surfaces of wheels during execution of tight turns. Trains typically do not execute tight turns, since tracks are laid out so the train must execute only gradual turns. In this way the train can maintain relatively high speeds at all times with little risk of derailment. Because trains only execute gradual turns, the train's wheels generally do not encounter large lateral friction loads. Therefore, these railroad devices do not address or solve problems associated with laterally directed forces applied to wheels.

It would therefore be desirable to provide a mechanism which reduces tire wear of large highway vehicles caused during execution of tight turns of relatively small radius. It would be desirable to provide a mechanism which helps the tires resist failure when the tires encounter large lateral friction loads during tight turns. It would also be desirable for such a mechanism to help eliminate damage to paved surfaces caused by the laterally directed friction forces between the tires and the pavement during tight turns.

BRIEF SUMMARY OF THE INVENTION

The preferred embodiment of the present invention provides a lubricating mechanism which lubricates the tires during execution of a turn to thereby reduce friction between the tires and the surface of the pavement, which results in less tire wear, fewer tire failures and less damage to the pavement surface. The main components of the lubricating mechanism include a pump, holding tank, conduits, nozzles or spray nozzles, and an operator engagement mechanism such as a button located in the vehicle operator's station. Before the operator initiates a sharp turn he will depress the button for a short period of time which will engage the lubricating mechanism. The pump will direct fluid from the tank through the conduits and through the various nozzles such that fluid will be directed onto the respective tires. The fluid will act as a lubricant on the tires and serve to reduce friction between the tires and the road surface so that the lateral forces encountered by the tires and the road surface during tight turns is generally reduced. This reduces tire wear. Since the lateral forces encountered by the tires are reduced, the tire treads are less likely to be loosened or torn from the tires or otherwise fail. The reduction in the friction force applied to the roadway by the tires also help prevent the road surface from being damaged or otherwise peeling during execution of a tight turn.

DESCRIPTION OF THE DRAWINGS

FIG. 1 shows a semi-tractor trailer provided with the lubricating mechanism according to the present invention.

FIG. 2 shows the lubricating mechanism in an alternate location.

DETAILED DESCRIPTION OF THE INVENTION

Referring now to FIGS. 1 and 2, there is shown the lubricating mechanism 10 according to the present invention. FIG. 1 shows a semi-tractor 12 pulling a trailer 14. The tractor 12 has front steerable wheels 16 and rear non-steerable wheels 18. The trailer 14 is allowed to pivot with respect to the tractor 12 about a hitch mechanism 20. The wheels 22 of the trailer 14 are non-steerable. The semi-tractor 12 is capable of executing sharp or tight turns having relatively small radius. Such turns are often necessary when maneuvering the vehicle 12 in confined spaces such as parking lots, gas stations, and near loading docks. During tight turns, the semi-tractor 12 pivots with respect to the trailer 14 about the hitch mechanism 20. As the semi-tractor 12 turns more sharply, the semi-tractor 12 can pull the trailer 14 in such a way that the trailer 14 will eventually pivot about an axis which extends vertically through the rear of the trailer 14. Such turns are generally known as zero radius turns. As the front wheels 16 of the semi-tractor 12 turn sharply to execute a tight turn, the horizontal surfaces of the rear wheels 18 of the semi-tractor 12 and the horizontal surfaces of the trailer wheels 22 are dragged or slide laterally in contact with the surface of the pavement 24 as they roll forward during execution of the turn.

The present invention provides a lubricating mechanism 10 which lubricates the tires 18 and 22 during execution of a turn to thereby reduce friction between the various tires 18 and 22 and the surface of the pavement 24, which results in less tire wear, fewer tire failures and less damage to the pavement surface 24. The main components of the lubricating mechanism 10 include a pump 26, holding tank 28, conduits 30, nozzles or spray nozzles 32, and an operator engagement mechanism such as a button 34 located in the vehicle operator's station or cab 36. Before the operator initiates a sharp turn he will depress the button 34 for a short period of time which will engage the lubricating mechanism 10. The pump 26 will direct fluid from the tank 28 through the conduits 30 and through the various nozzles 32 such that fluid will be directed onto either the front or rear of the respective tires 18 and 22. The fluid will act as a lubricant on the tires 18 and 22 and serve to reduce friction between the tires 18 and 22 and the road surface 24 so that the lateral forces encountered by the tires 18 and 22 and the road surface 24 during tight turns is generally reduced. This reduces tire wear. Since the lateral forces encountered by the tires 18 and 22 are reduced, the tire treads are less likely to be loosened or torn from the tires 18 and 22. The reduction in the friction force applied to the roadway 24 by the tires 18 and 22 also help prevent the road surface 24 from being damaged or otherwise failing during execution of a tight turn.

The fluid held in the tank 28 and applied to the tires 18 and 22 can be any suitable lubricating liquid, such as water. Water is particularly advantageous, since it is environmentally safe and will relatively quickly evaporate from the tires so that vehicle traction is not hindered for long periods after the lubricant is applied to the tires. In winter, windshield washer fluid can be used or some other liquid that would resist freezing within the lubricating mechanism 10 and on the tires 18 and 22.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A mechanism adapted for reducing damage to a tire of a vehicle caused by execution of sharp turns, comprising:
   a) a vehicle body adapted to execute substantially sharp turns;
   b) at least two wheels including ground engaging tires which supports the vehicle body above a ground surface, said tires being adapted to roll across the ground surface during forward vehicle travel, said tires slide across the surface of the ground laterally with respect to forward vehicle travel during execution of a turn such that the tires encounter substantial laterally directed forces during execution of said turn; and
   c) a lubricating mechanism carried by said vehicle for lubricating said tires with a lubricating fluid such that the fluid lubricates the tires for reducing friction between the tires and the ground as the tires slide laterally across the ground surface during execution of a sharp turn.

2. The invention of claim 1, and further comprising an operator engagable control for allowing a vehicle operator to selectively actuate the lubricating mechanism.

3. The invention of claim 1, wherein said lubrication mechanism includes nozzles for directing the lubricating fluid to said tires.

4. The invention of claim 1, wherein portions of the vehicle body are capable of executing turns of approximately zero turning radius, which cause the tires to encounter relatively large lateral forces as the tires slide in the lateral direction during execution of said turn.

5. The invention of claim 1, wherein said vehicle further comprises a semi tractor trailer vehicle.

6. The invention of claim 4, wherein said tires support a trailer portion of the semi tractor trailer vehicle.

7. The invention of claim 4, wherein said tires support a tractor portion of the semi tractor trailer vehicle.

8. A mechanism adapted for reducing damage to a tires of a vehicle caused by execution of sharp turns, comprising:
   a) a vehicle body adapted to execute substantially sharp turns of approximately zero turning radius;
   b) at least two ground engaging tires which support the vehicle body above a ground surface, said tires being adapted to roll across the ground surface during forward vehicle travel, and said tires slide across the surface of the ground laterally with respect to forward vehicle travel during execution of sharp turns such that the tires encounter large laterally directed forces during execution of said sharp turn;
   c) a lubricating mechanism including nozzles carried by said vehicle for lubricating said tires with a lubricating fluid such that the fluid lubricates the tires for reducing friction between the tires and the ground as the tires slide laterally across the ground surface during execution of a sharp turn; and
   d) an operator engagable control for allowing a vehicle operator to selectively actuate the lubricating mechanism.

* * * * *